July 5, 1938.   G. W. VON HOFE   2,123,030
CLUTCH
Filed May 20, 1936

INVENTOR
GEORGE W. VON HOFE
BY
ATTORNEYS

Patented July 5, 1938

2,123,030

UNITED STATES PATENT OFFICE 2,123,030

CLUTCH

George W. von Hofe, Bound Brook, N. J., assignor to New Jersey Machine Corporation, Hoboken, N. J., a corporation of New Jersey Application May 20, 1936, Serial No. 80,674

13 Claims. (Cl. 192—29)

The invention relates to mechanical clutches and has for its object to provide a simple and economically made clutch capable of being operated efficiently in a reverse as well as a forward direction. Other more specific objects will appear from the description hereinafter and the features of novelty will be pointed out in the claims.

Figure 1:
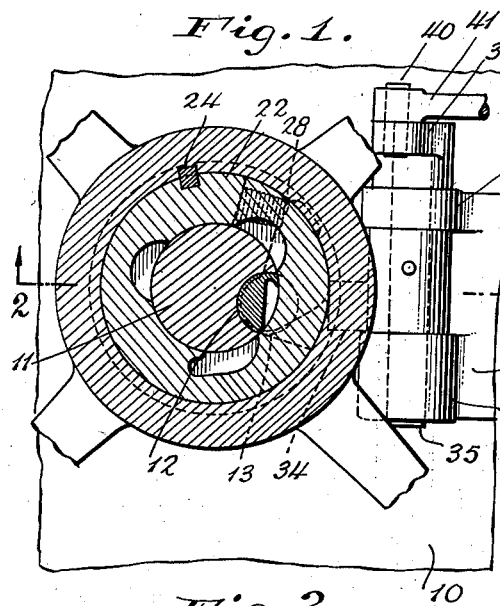
Figure 3:
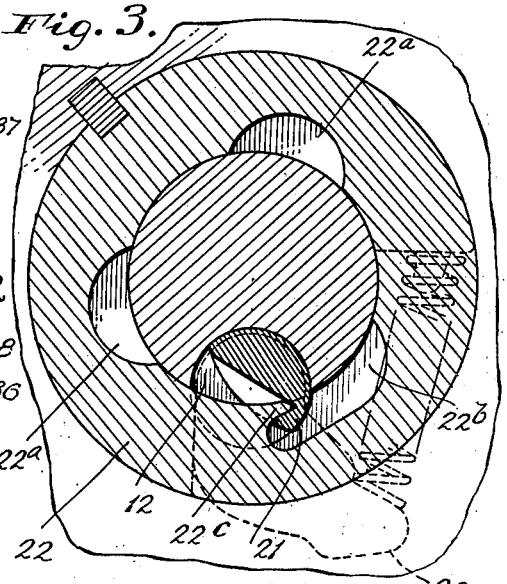
Figure 2:
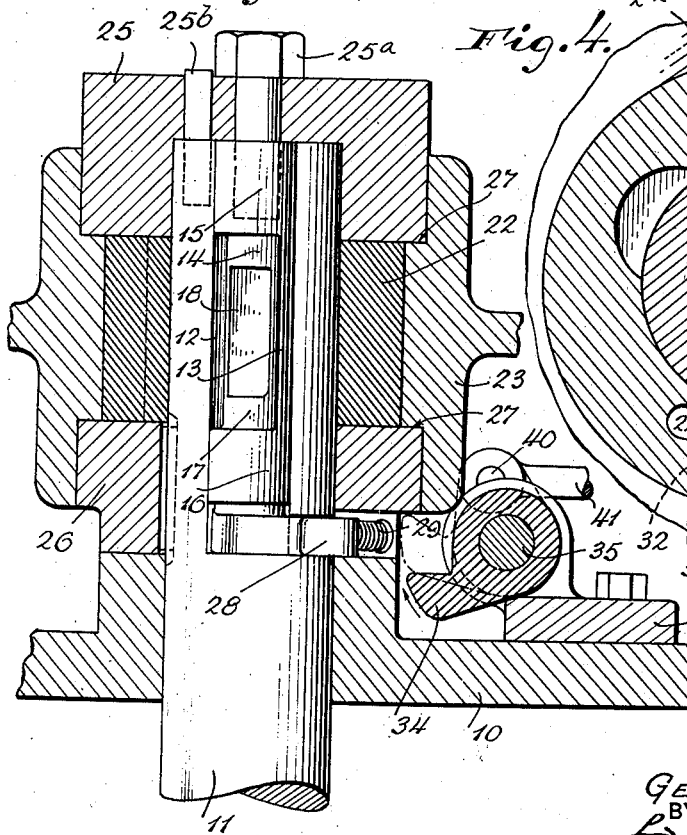
Figure 4:
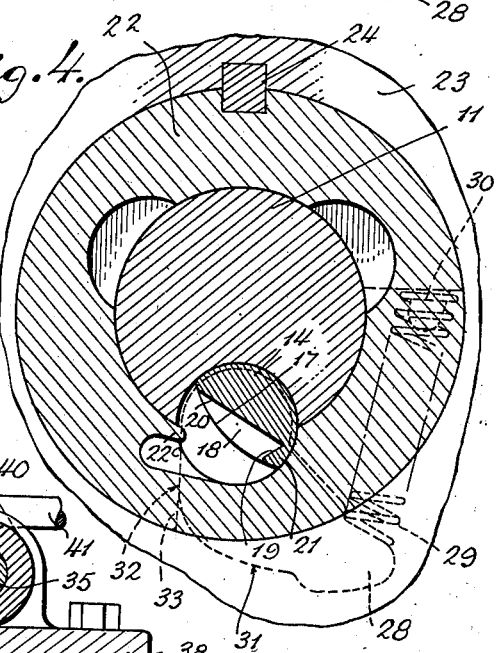

In the accompanying drawing which illustrates an example of the invention without defining its limits, Fig. 1 is a fragmentary view, partly in section, of the novel clutch and its associated elements; Fig. 2 is a partial sectional view on the line 2—2 of Fig. 1 looking in the direction of the arrows, certain parts being shifted to more clearly indicate the construction; Fig. 3 is an enlarged fragmentary section similar to Fig. 1 and showing the clutch in reversing engagement, and Fig. 4 is a fragmentary section similar to Fig. 3 but showing the clutch in forward driving engagement.

In the drawing 10 designates the frame of a machine in which the driven shaft 11 is rotatably mounted, said shaft 11 being provided with a lengthwise groove 12 in which a key 13 is seated. The key 13 is cylindrical and has an intermediate section 14 located between its ends 15 and 16, said section 14 of the key 13 constituting a segmental portion having a surface 17 curved in an arc having a radius corresponding to the radius of the shaft 11; the arrangement is such that when the key 13 is mounted in the shaft 11 said key 13 normally occupies a position in which the surface 17 is concentric with the center of the shaft 11 and substantially flush with the circumferential surface thereof. In the surface 17 is cut a recess 18 bounded by the plane walls 19 and 20 extending in planes parallel to the axis of said key 13 and forming a coupling shoulder 21 as shown in Figs. 3 and 4.

The cylindrical ends 15 and 16 of the key 13 provide bearings for the rotation of the key 13 in the groove 12 of the shaft 11 in the manner and for the purpose to be more fully set forth hereinafter. Encircling the shaft 11 and key 13 is a collar or drive member 22 which is mounted in fixed relation to the power member 23 to rotate therewith for instance by means of the key 24. In the internal wall of the drive member 22 a series of notches 22a, 22a, 22b, are provided, the notches 22a being arranged to individually register with the groove 12 and being so shaped that their surfaces are concentric with the axis of rotation of the key 13 when in registering relation with said groove 12. The notch 22b which also is adapted to register with the groove 12 has only a part of its surface concentric with the axis of rotation of the key 13, the remaining portion of the notch 22b being formed or recessed to provide a tooth like structure or undercut projection 22c. The latter extends circumferentially of the drive member 22 and lies flush with the encircling surface thereof and is adapted under certain conditions to project into the recess 18 of the key 13 in overlapping engagement with the shoulder 21 as is clearly shown in Fig. 3. During any given operative period the power member 23 may be continuously rotated by any convenient source of power, it being understood that the projection 22c and the opposite curved end of the notch 22b constitute spaced coupling devices which normally travel in a circular path outside of the coupling device or shoulder 21 so that the drive or power member 23 rotates freely on and relatively to the driven member or shaft 11. Rigidly fixed on the shaft 11 are two collars 25 and 26, which preferably are recessed to accommodate the cylindrical ends 15 and 16 of the key 13, thereby providing a means for confining the key 13 in the groove 12. On the outer surfaces of the collars 25 and 26, the power member 23 is rotatably mounted and held in place against excess longitudinal movement by shoulders 27 formed on said power member 23 and projecting inwardly beyond said collars 25 and 26.

To the end 16 of the key 13 is fixed the arm 28 which extends radially therefrom and has one end of a compression spring 29 in engagement therewith, the other end of the spring 29 being supported by a pin 30 which is suitably mounted on the collar 26 rigidly attached to the shaft 11. The spring 29 urges the key 13 to rotate about its longitudinal axis on the bearing ends 15 and 16 in the groove 12 of the shaft 11 and co-operating recesses provided in the collars 25 and 26. Longitudinal movement of the key 13 in the groove 12 is prevented by the collar 25 and the opposite end of the socket in the shaft 11, said collar 25 being held in fixed relation to the shaft 11 in any suitable manner as by means of the screw 25a and pin 25b. A portion of the other collar 26 is removed in the proximity of the arm 28 of the key 13 to allow free movement of the key 13 about its longitudinal axis as will appear more fully hereinafter.

The arm 28 of the key 13 is provided with a curved surface 31 a part of which has a radius corresponding to that of the drive member 22 and concentric with the surface 17 of the section 14 of the key 13; the arm 28 is further provided with a shoulder 32 arranged to cooperate with a shoulder 33 formed on the collar 26 as will be more fully set forth hereinafter. In practice the arm 28, under certain conditions is adapted to engage a pawl 34 which is rigidly fixed on a shaft 35, loosely mounted in the bearings 36 and 37, the latter comprising integral parts of a bracket 38 bolted to the side frame 10. To one end of the shaft 35 is secured the lever 39 provided with a pin 40 on which is loosely mounted a connecting link 41, it being understood that the connecting link 41 is operatively connected to suitable means for operatively reciprocating the link 41, as for instance a lever controlled by the machine operator.

The type of clutch just described is widely used on hand operated machines wherein the machine performs an operation on an article and in which it is necessary to stop the machine after the work stroke, remove the article and put a new article in place to be operated upon. In order to stop such a machine it generally is not feasible or efficient to stop the driving means, so that it is desirable to use a clutch of the type described in order that the machine may be temporarily disconnected from the driving means when periodic stoppage of said machine is desired.

Another use of this type of mechanism is in automatic machines having coating or like devices operating in relation with other mechanisms. In this type of machinery it is often desirable to shut down the machine momentarily, while at the same time it is impractical to stop the coating mechanism, usually consisting of a series of rolls, as they would become fouled in the interim. To avoid this it is desirable to provide a clutch such as described herein so that the main part of the machine may be disconnected from the coating mechanism whenever this may be necessary or desirable.

At certain times, when the machines mentioned are being set or adjusted for operation, it often becomes necessary to turn them backwards to facilitate the adjusting operations. In existing clutches of this type, expensive and complicated additional parts are required in order to obtain the desired results.

The operation of the mechanism described hereinbefore is as follows:

Under normal operating conditions, the power member 23 with the collar 22 fixed in driving relation therewith by the square key 24, is rotating in a clockwise direction as viewed in Figs. 1, 3 and 4. If the machine is being driven by the clutch, the pawl 34 will be positioned as shown in Fig. 2, i. e., out of line with the arm 28 of the key 13. When this condition prevails, the spring 29 backed by the collar 26 urges the key 13 about its longitudinal axis in one direction to a given coupling position until the shoulder 32 strikes the co-operating shoulder 33 of the collar 26. This will result in the condition shown in Fig. 4 where the key 13 in said given coupling position is indicated in driving engagement with the curved surface of the notch 22b. As the surface of the notch 22b engages the cylindrical surface of the key 13, the shaft 11 will be rotated in the frame 10 thereby driving the machine's operating parts. This driving condition will obtain as long as the pawl 34 is held out of the path of the arm 28. If, however, the pawl 34 is moved to the position indicated by the dotted lines shown in Fig. 2, by operating the link 41, pin 40 and lever 39 to rock the shaft 35, the surface 31 of the arm 28 will strike the pawl 34 which will cause the key 13 to rotate about its longitudinal axis in the opposite direction until the surface 17 thereof is concentric with the axis of the shaft 11 and substantially flush with the circumferential surface thereof as illustrated in Fig. 1; in this position a portion of the surface 31 of the arm 28 will also be concentric with the shaft 11, and will allow the momentum of the moving parts to be dissipated to thereby bring the shaft 11 with its attendant parts to a standstill without affecting the position of the key 13.

If for any reason it becomes necessary or desirable to reverse the rotation of the shaft 11 and its associated mechanism, the pawl 34 is restored to the solid line position in Fig. 2 to permit the spring 29 to again rock the key 13 on its axis in the same direction as previously mentioned to the aforesaid given coupling position shown in Figs. 3 and 4. A rotation of the drive member 22 and power member 23 in a reverse direction, under such conditions with the key 13 in said given coupling position, will cause the projection 22c to enter the recess 18 in overlapping engagement with the shoulder 21 of the key 13 and to thereby transfer such rotation in a reverse direction to the shaft 11 and the mechanism operated thereby. Under such conditions the projection 22c and the recess 18 with its shoulder 21 constitute co-operating means on the drive member 22 and the key 13 arranged to couple said drive member 22 and driven member or shaft 11 together and to prevent axial rotation of the key 13 when the drive member 22 is rotated in the reverse direction. This reversal of the shaft 11 may be accomplished by manual actuation of the power member 23 when said reversal is required to facilitate adjustment of the machine, or it may be brought about by applying power to the power member 23 when reverse operation of the machine for an extended period is desired.

With the arrangement as illustrated and described, the drive member 22 is provided with a plurality of coupling devices in spaced relation at the encircling surface thereof, said devices being exemplified by the projection 22c and the curved opposite end of the notch 22b. The key 13, which is mounted for axial rotation in the longitudinal groove 12 of the driven member or shaft 11, in turn is provided with a co-operating coupling device normally lying within the groove 12 outside of the circular path of the coupling devices of the drive member 22. The coupling device of the key 13 is exemplified by the shoulder 21 which, by axial rotation of said key 13, is movable into the notch 22b to a position between and in the circular path of the projection 22c and the curved opposite end of said notch 22b for selective engagement with either of them dependent upon the direction of rotation of the drive member 22 to correspondingly rotate the driven member or shaft 11.

The novel clutch shown and described herein is simple in construction and of maximum efficiency in both forward and reverse driving and requires no particular skill in its operation and control; because of its simplicity the novel clutch is capable of being easily installed even in existing machines for which it is adapted.

It is to be particularly noted that the rotation of the key 13 on its axis to its given coupling position is always in the same direction regardless as to whether the driven member 11 is to be actuated in one direction or the reverse direction, and that no movement of said key 13 in any other direction is required to effect rotation of the driven member 11 in opposite directions.

Various changes in the specific forms shown and described may be made within the scope of the claims without departing from the spirit of the invention.

I claim:

1. The combination of a drive member, a driven member, and a key mounted for axial rotation in said driven member and rotatably adjustable in one direction to a given coupling position, said drive member and said key each having a plurality of faces adapted in said given coupling position of said key to co-operate in pairs for respective driving engagement when said drive member is rotated either in a clockwise or counter-clockwise direction whereby said driven member may be correspondingly rotated in opposite directions when said key occupies said given coupling position.

2. The combination of a drive member, a driven member, a key mounted for axial rotation in said driven member and rotatably adjustable in one direction to a given coupling position, said drive member and said key each having a plurality of faces adapted in said given coupling position of said key to co-operate in pairs for respective driving engagement when said drive member is rotated either in a clockwise or counter-clockwise direction, and means to rotate said key whereby said driven member may be correspondingly rotated in opposite directions when said key occupies said given coupling position.

3. In a clutch of the kind described, a clutch key adapted for axial rotation having a surface concentric with said axis, a surface eccentric with said axis, and a recess cut in said eccentric surface to provide a coupling device on said key.

4. In a clutch of the kind described, a clutch key adapted for axial rotation having a surface concentric with said axis, a surface eccentric with said axis, and a recess in said eccentric surface, two sides of said recess extending in planes parallel to the axis of said key to provide a coupling shoulder on said key.

5. In a clutch of the kind described, a clutch key adapted for axial rotation and provided with a surface concentric with its longitudinal axis, a surface eccentric with its longitudinal axis, and a recess in said eccentric surface, the major sides of which form an acute angle in relation to each other to provide a coupling shoulder on said key.

6. In a clutch of the kind described, a rotatable clutch driving member, a driven member, one of said members having a wall concentric with its longitudinal axis provided with a series of notches, and a clutch key mounted for axial rotation in the other member and rotatably adjustable about its axis in one direction to a given coupling position, at least one of said notches being adapted to contact said rotatable clutch key in said coupling position when said driving member is rotated in either a clockwise or counter-clockwise direction whereby said driven member may be correspondingly rotated in opposite directions when said clutch key occupies said given coupling position.

7. The combination of a drive member, a driven member, a key rotatably mounted in said driven member, notches cut in said drive member to contact said key in driving engagement when rotating in one direction, and co-operating means on said drive member and key arranged to couple said drive member and driven member together and to prevent axial rotation of said key when the drive member is rotated in the opposite direction.

8. The combination of a drive member, a driven member, a key rotatably mounted in said driven member, notches cut in said drive member to contact said key in driving engagement when rotating in one direction, and co-operating means on said drive member and key arranged to couple said drive member and driven member together and to prevent axial rotation of said key when the drive member is rotated in the opposite direction, said co-operating means comprising an angular recess in said key and a projection complementary to said recess on said drive member.

9. The combination of a drive member and a driven member having a common axis, one of said members having a surface groove extending lengthwise thereof, and the other of said members being provided with a surface notch having a curved end and a circumferentially extending projection in opposed spaced relation to each other, a key mounted for axial rotation in said surface groove, a shoulder carried by said key and normally lying within said groove, and means for axially rotating said key to shift said shoulder into said notch for selective engagement respectively with said curved end or projection dependent upon the direction of rotation of said drive member to correspondingly rotate said driven member.

10. The combination of a rotatable driven member, a drive member encircling said driven member in rotatable surface engagement therewith, one of said members having a longitudinal surface groove and the other of said members having a surface notch, a key mounted for axial rotation in said groove, coupling devices located in pairs respectively on said key and in said notch and normally lying in independent circular paths, and means for axially rotating said key in a given direction to shift its pair of coupling devices into said notch into the circular path of the pair of coupling devices therein for selective engagement therewith whereby the driven member is connected with said drive member for operation thereby.

11. The combination of a rotatable driven member, a drive member encircling said driven member in rotatable surface engagement therewith, said driven member having a longitudinal surface groove, an undercut coupling projection on said drive member extending circumferentially thereof and lying flush with the encircling surface of said drive member, a key mounted for axial rotation in said groove, a coupling shoulder on said key normally lying within said groove out of the circular path of said coupling projection, and means for axially rotating said key to shift its coupling shoulder into the circular path of said coupling projection whereby the driven member is connected with said drive member for operation thereby.

12. The combination of a rotatable driven member, a drive member encircling said driven member in rotatable surface engagement therewith, said driven member having a longitudinal surface groove, a plurality of coupling devices on said drive member in spaced relation at the encircling surface thereof, a key mounted for axial rotation in said groove, a coupling shoulder on said key normally lying within said groove out of the circular path of said plurality of coupling devices, and means for axially rotating said key to shift its coupling shoulder to a position between and in the circular path of said coupling devices, for selective engagement with either of said devices dependent upon the direction of rotation of said drive member to correspondingly rotate said driven member.

13. The combination of a rotatable driven member, a drive member encircling said driven member in rotatable surface engagement therewith, said members having surface recesses in their contiguous surfaces, a pair of spaced coupling devices fixed in the recess of one member, a coupling device normally lying within the recess of the other member and movable about an axis parallel with the common axis of said members, and means for shifting said movable coupling device out of its recess in a given direction into the recess of the other member for selective engagement with either of said fixed coupling devices dependent upon the direction of rotation of the drive member to correspondingly rotate the driven member.

GEORGE W. VON HOFE.